Nov. 22, 1949  M. E. HAMILTON ET AL  2,488,592
COMBINE HAVING SIDE HILL PLATFORM ADJUSTMENTS
Filed Aug. 19, 1942  5 Sheets-Sheet 1

INVENTOR
Matthew E. Hamilton
Patrick W. Morrissey
BY
Emerson B. Donnell
ATTORNEY.

Patented Nov. 22, 1949

2,488,592

UNITED STATES PATENT OFFICE 2,488,592

COMBINE HAVING SIDEHILL PLATFORM ADJUSTMENTS

Matthew E. Hamilton and Patrick W. Morrissey, Racine, Wis., assignors to J. I. Case Company, Racine, Wis., a corporation Application August 19, 1942, Serial No. 455,302

9 Claims. (Cl. 56—209)

1

The present invention relates to combines or combination harvester threshers and an object thereof is to generally improve the construction and operation of devices of this class.

The principal object is to provide improvements in such devices designed to operate in rolling country and where the fields are hilly enough to interfere with or even prohibit the use of combines of conventional type.

Further objects are to provide such a combine having only two wheels; such a structure including an improved chassis frame arrangement which will be light but strong and sturdy; such an arrangement in which the pull of the tractor used in propelling the combine, and the drag of the combine wheels will be imposed only on the chassis frame, and isolated from the relatively delicate thresher body; novel leveling mechanism; a novel arrangement of brakes for such a combine; improved connections for the several controls; and improved arrangements for coordinating the harvester or header portion with the thresher or body portion at various inclinations of the ground and facilitating the feeding of material under these several conditions. Other objects and advantages will become apparent from the following specification and accompanying drawings in which a satisfactory embodiment of the invention is shown, but it is to be understood that the invention is not intended to be taken as limited to the details disclosed but is to be understood to include all such variations and modifications as fall within the spirit of the invention as herein expressed.

In the drawings,

2

Fig. 12 is a vertical sectional view taken substantially on the line 12—12 of Fig. 11.

Figures 1, 11, 13, 14, 16:
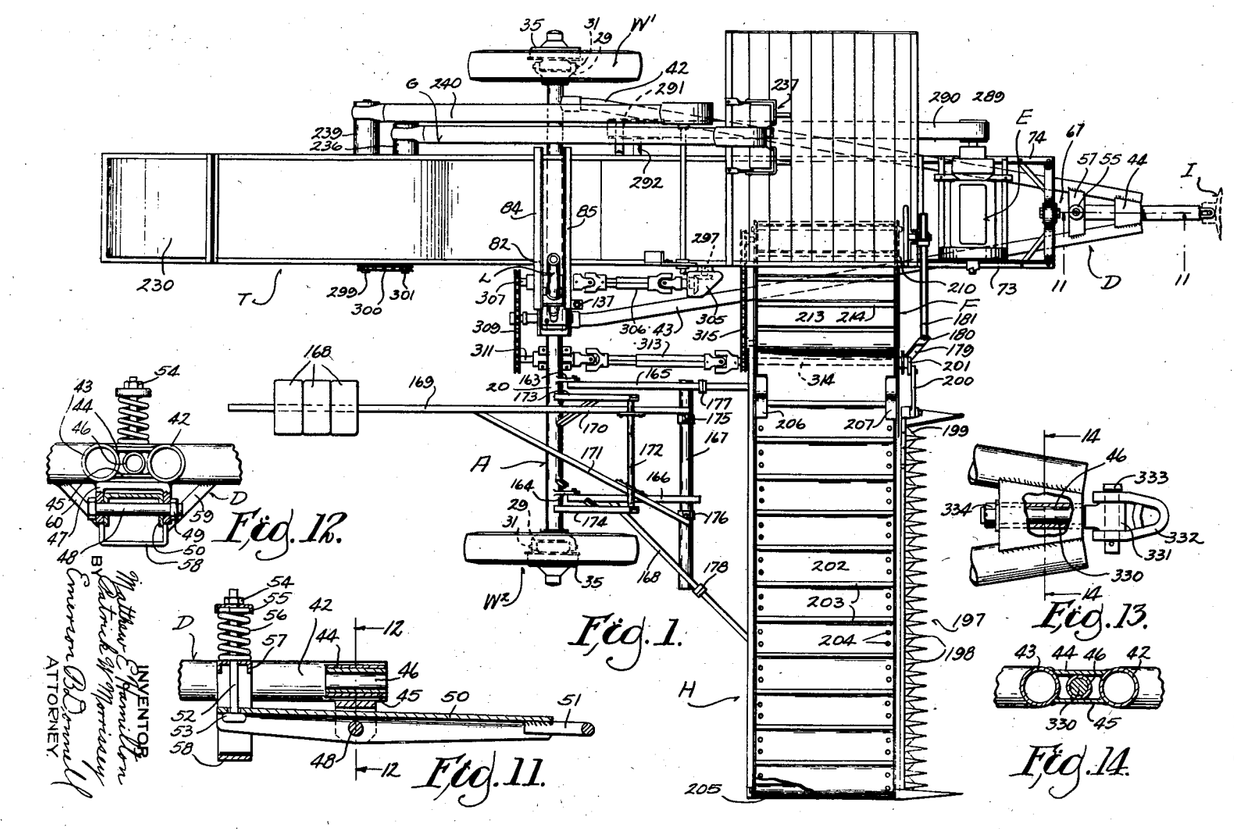
Figure 1 is a plan view of a machine illustrative of the invention.
Fig. 11 is a sectional view taken on the line 11—11 of Fig. 1.
Fig. 13 is a plan view with parts broken away of a modified construction of draw bar.
Fig. 14 is a sectional view taken on the line 14—14 of Fig. 13.
Fig. 16 is a left side elevation of a modified type of machine embodying the invention.

As is seen in Fig. 1, the combine is supported on wheels generally designated as $W^1$ and $W^2$ supporting an axle structure A, a draw bar structure D being attached to the axle and suported on a tractor I or the like, the latter forming a third point of support for the combine. The structure so far described provides a unitary stable structure for travel over uneven ground and from which the other parts of the machine are supported. A thresher body T is supported on axle A and draw bar structure D and a header or harvester H is supported largely from axle A in position to harvest a crop and feed it to body T through a feeder spout F. Header H carries a reel R and the mechanism is operated from an engine E mounted on body T. Beneath body T is suspended a cleaning shoe C and from which leads a clean grain elevator G leading in the present instance to a point above an operating platform P on which the grain may be bagged and from which the various functions of the machine may be controlled. A bag chute B leads from the vicinity of platform P to a point close to the ground and through which the filled bags may be placed on the ground without danger of damage.

Leveling mechanism generally designated as L connects thresher body T with axle A and may be controlled for keeping body T substantially level regardless of the side slope of the ground over which the machine travels.

Hillside combines are made in general so that they can be tilted, or rather the supporting means can be adjusted to keep the combine level as regards lateral or rolling motion, regardless of whether the ground is level or slopes one way or the other. This has been accomplished in various ways in the past with cumbersome and expensive mechanism and generally with the use of three or more wheels, articulated axles, and the like. In the present instance, partly by virtue of the novel axle and draw bar construction above outlined, a very simple direct actuating mechanism is possible and which is light, rugged, inexpensive, and extremely effective for the purpose intended. As a result, a hillside type combine can be produced which is small and light enough to be drawn by a small inexpensive tractor. In the past, hillside combines have substantially invariably been very large and required a very heavy tractor for operation. As a result, the average owner of a farm requiring this type of combine would be unable to afford one of his own. By virtue of the present invention, the cost of the combine is not only reduced but also the cost of the motive power necessary to pull it is reduced, and in many instances the reduced size of the combine permits the use of a tractor which the farmer already has. The benefit to grain farmers in the hill country, by virtue of this invention is therefore apparent and material.

Figures 3, 4:
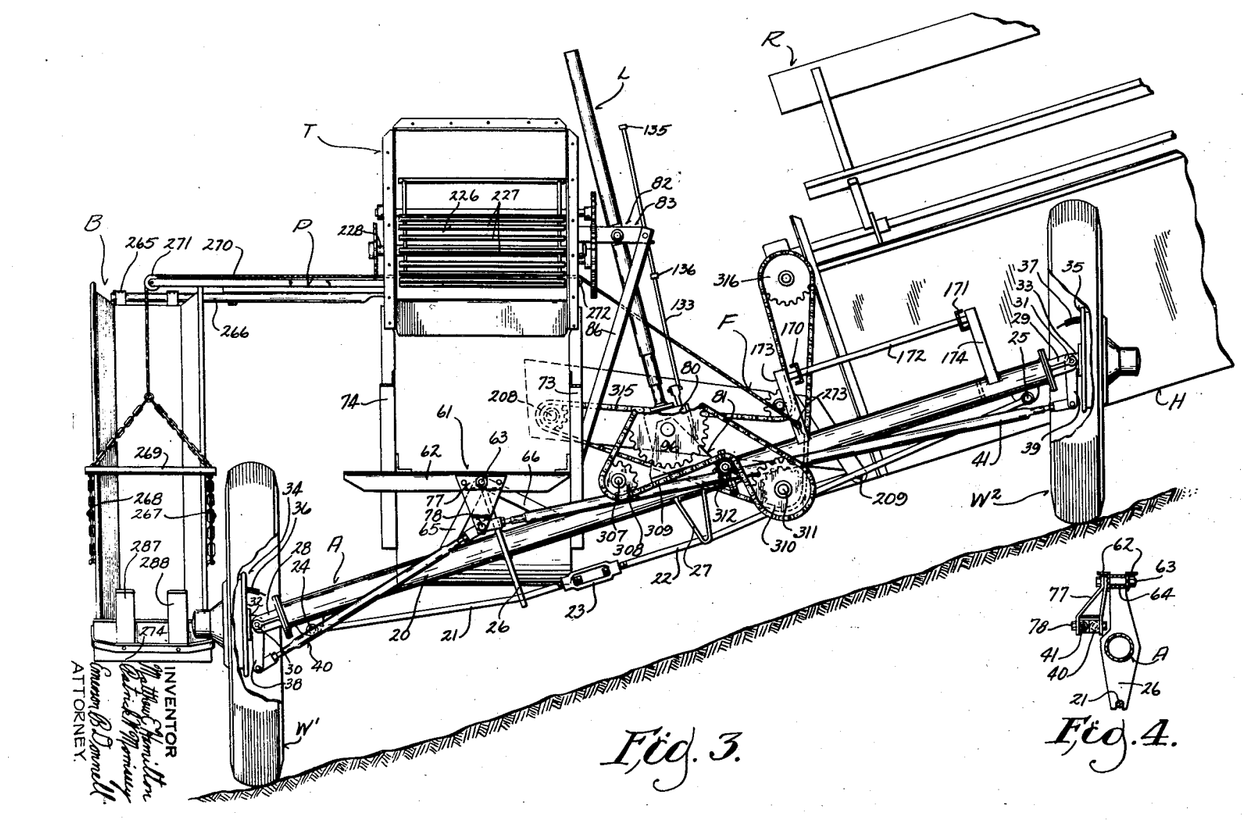
Fig. 3 is a vertical sectional view substantially on the line 3—3 of Fig. 2, showing the machine in position to operate on a side hill.
Fig. 4 is a detail of certain mechanism indicated in Fig. 3.

Returning to a detailed description of the various parts of the combine, the axle A comprises in general a tube or similar member 20, Fig. 1, truss rod sections 21 and 22, Fig. 3, united by a turnbuckle or suitable adjusting device 23, being in the present instance pivotally connected at 24 and 25 with axle tube 20 and spaced therefrom by uprights or struts 26 and 27. Axle tube 20 is thus braced against sagging under the weight of the several attached parts.

Tube 20 has united therewith, in any suitable manner, fittings 28 and 29 preferably in the form of yokes as indicated in Fig. 1 having pivoted thereto as by pins 30 and 31, Fig. 3, stub axle elements 32 and 33 on which are journaled in suitable or well-known manner above mentioned wheels W¹ and W². Wheels W¹ and W² include brake units generally designated as 34 and 35 respectively. The latter being of well-known automotive type, need not be further described except to say that they include actuating cables 36 and 37, the operation of which will be described presently. Stub axles 32 and 33 include in the present instance downwardly extending arms 38 and 39 actuated by "drag links" generally designated as 40 and 41 respectively to control the position of wheels W¹ and W² relatively to axle A in a manner which will appear shortly.

Axle A has united therewith in any suitable manner in the present instance tubular draw bar elements 42 and 43, Fig. 1, united at their forward ends by a plate 44 thus forming with axle A a rugged triangular unit carried on wheels W¹ and W² and tractor I. A unit is thus provided comprising axle A and draw bar D which may operate on extreme side slopes by virtue of the relatively wide spread of wheels W¹ and W² and from which may be supported in an adjustable manner the other necessary units of the combine.

Various modes of attachment to tractor I are contemplated, but in the present instance, a yielding connection as shown in Figs. 1, 11 and 12 is shown. Plate 44 is spaced from a similar plate 45 by a tubular reinforcement 46, the whole being united as by welding to form a solid joining means for tubes 42 and 43. In the present instance beneath plates 44 and 45 a yoke-like member 47 is united with tubes 42 and 43 and carries a fulcrum pin 48 maintained in place as by a nut 49. Pivoted on pin 48 is a lever 50 preferably of channel section and having at its forward end a loop or eye portion 51 for attachment to tractor I. At its rear end lever 50 is connected with a rod or bolt member 52 in the present instance provided with a head 53 and a nut 54. Nut 54 bears against a washer or cap 55 resting against a spring 56 which in turn rests on a cross piece or brace 57 united with tubes 42 and 43. Thus the weight of the front end of draw bar D imposed on fulcrum 48 and resisted at 51 by tractor I will rock lever 50 and pull downwardly on bolt 52 tending to compress spring 56. The flexibility of spring 56 will thus cushion any shocks imparted to the structure by travel of the tractor or wheels W¹ and W² over uneven ground.

When draw bar D is traveling at a substantial angle to the horizontal, the weight imposed on fulcrum 48 will cause a substantial side thrust on lever 50. In the present instance the rear end of lever 50 is braced against misalignment by such side thrust by means of a guide member 58 comprising a substantially U-shaped element depending from above mentioned brace 57.

Member 58 may be united with brace 57 in any suitable manner as by welding and diagonal braces 59 and 60 are preferably extended from the sides of member 58 to adjacent tubes 42 and 43 respectively. The rear end of lever 50 is thus prevented from swinging sidewise while being free for up-and-down movement.

Obviously, when the machine is operating on a side hill, axle A will tilt into a position such that it is inclined to substantially the same degree as the hill. It is important, however, that thresher body T remain as nearly as possible in a vertical plane transverse to axle A. Body T, therefore, is mounted so that it may be tilted from side to side relatively to axle A, or more properly so that it may be caused to remain in a vertical plane while axle A tilts from side to side.

Figures 2, 5, 15:
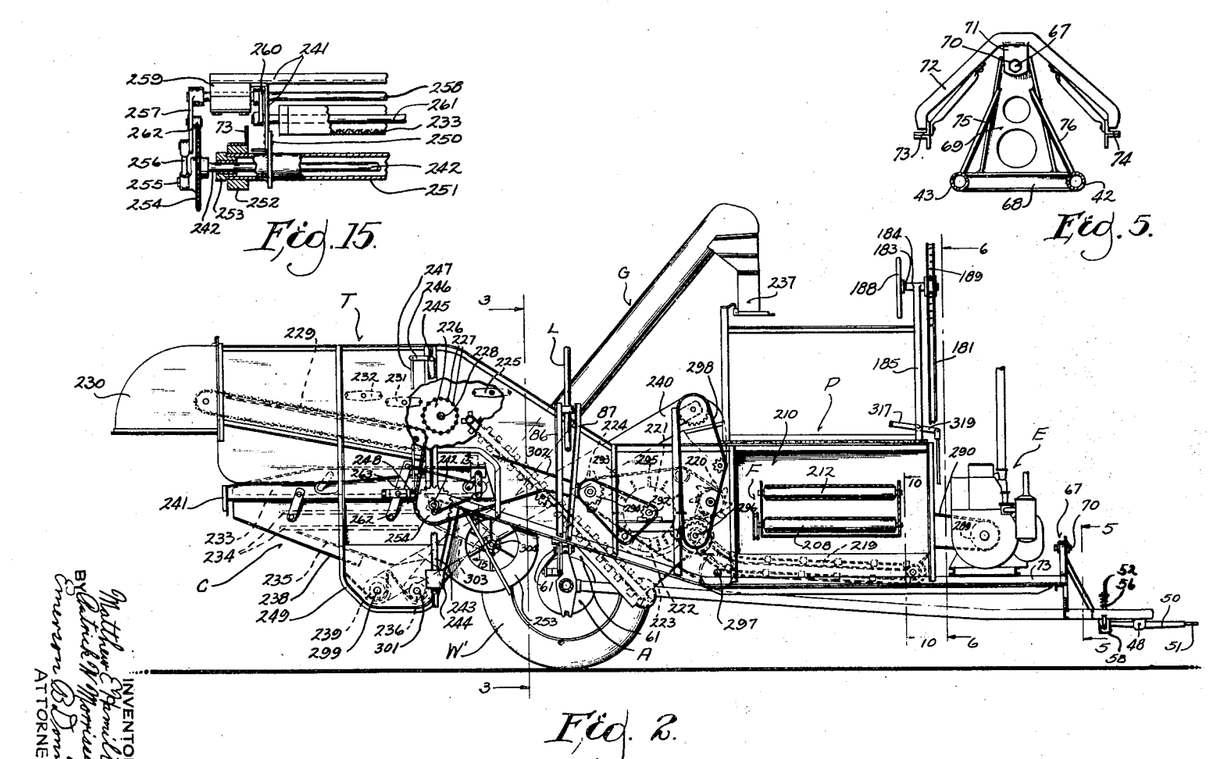
Fig. 2 is a right side elevation of the same with parts removed and others in section and broken away.
Fig. 5 is a detail of certain mechanism indicated in Fig. 2.
Fig. 15 is a sectional view taken on the line 15—15 of Fig. 2.

Referring to Fig. 1, thresher body T is supported at two points on the triangular unit formed by axle A and draw bar D, in the present instance spaced longitudinally of body T. Thus at a point substantially over axle A, as seen in Figs. 2, 3 and 4, body T is supported on a pivot generally designated as 61. Thresher body T in the present instance is built up of elements of well-known form, not necessary to describe in detail, and a large portion of the weight thereof is concentrated in a cross member 62. A pivot pin or bolt 63 traverses cross member 62 and in the present instance is journaled in a bearing portion 64 carried by a portion of above mentioned strut or upright 26. Strut 26 is braced against side thrust, caused by the angle of strut 26 when the machine is traveling on a side hill, by braces 65 and 66. Thresher body T may be readily balanced on pivot 63 insofar as sidewise tilting is concerned.

Spaced from pivot 61 and near the front of the machine is a pivot generally designated as 67 so disposed as to be substantially on a level with pivot 61 when the machine is on level ground.

As more particularly seen in Fig. 5, draw bar tubes 42 and 43 are united by a cross member 68 at a point adjacent the extreme front end of thresher body T. Cross member 68 is united with tubes 42 and 43 in any suitable manner as by welding and carries an upright 69 having journaled therein a pivot or bolt 70. Bolt 70 traverses ears as 71 depending in the present instance from a yoke member 72 extending downwardly on either side of upright 69 into connection with angle irons or similar members 73 and 74, forming the sills of above mentioned thresher body T.

Upright 69 is braced to tubes 42 and 43 by diagonal braces 75 and 76 respectively. In this manner, pivot 67 is very strongly fixed in its relation to tubes 42 and 43. In this manner, thresher body T is suspended or supported on spaced pivots 61 and 67 and is stabilized or rocked from side to side by leveling mechanism L as will appear.

It is noted that pivots 61 and 67 are located substantially the same distance above the ground and that the common center line of the pivots passes through thresher body T substantially above sills 73 and 74. This gives superior feeding relations under side hill operation as will appear.

As above stated, drag links 40 and 41 control arms 38 and 39, Fig. 3, and accordingly wheels $W^1$ and $W^2$. In order to do this, a plate or arm 77 is fixed in the present instance with cross member 62 and extends downwardly to a pivot pin 78 to which are pivoted above mentioned drag links 40 and 41. Tilting of thresher body T about pivot 63 will accordingly actuate drag links 40 and 41 and rock levers 38 and 39. The centers of pivotal attachment are so chosen that wheels $W^1$ and $W^2$ will remain substantially in planes parallel to the plane of thresher body T. Thus, in operation on a side hill, wheels $W^1$ and $W^2$ and thresher body T are readily maintained in a vertical plane regardless of the tilting of axle A. This maintains the base of support, namely the space between the points of contact of wheels $W^1$ and $W^2$ with the ground, substantially in a constant relation to the center of gravity of the machine, or at least the major portion of the machine, so that it remains safe and stable throughout the extreme range of angular adjustment of the parts. Furthermore, the weight of the machine is imposed on wheels $W^1$ and $W^2$ in vertical planes so that there is no substantial side thrust to be resisted by said wheels.

The position or attitude of thresher body T and accordingly wheels $W^1$ and $W^2$ is controlled by leveling mechanism L. This mechanism comprises a telescopic or collapsible element connected between thresher body T and axle A and in the present instance is in the form of a screw 79 connected through a gear box 80 and a yoke element generally designated as 81 with axle A and having a nut portion generally designated as 82 connected through a bracket 83 with thresher body T. Rotation of screw 79 will therefore run nut 82 either up or down on screw 79 thereby changing the relation between thresher body T and axle A.

As more particularly seen in Fig. 1, bracket 83 comprises a plurality of cross members 84 and 85 between which nut portion 82 is engaged, and members 84 and 85, as seen in Fig. 2, are braced by struts 86 and 87 to sill 73 to form a strong connection to thresher body T. Screw 79 and its attached parts thus comprise telescopic means extended between the thresher body and the axle and capable of lengthening or shortening to maintain the thresher body level regardless of the tilting of axle A. Other telescopic means than a screw is contemplated since a number of the advantages of the invention could be realized by other forms of connection between thresher body T and axle A or draw bar D for leveling the machine.

Figure 8:
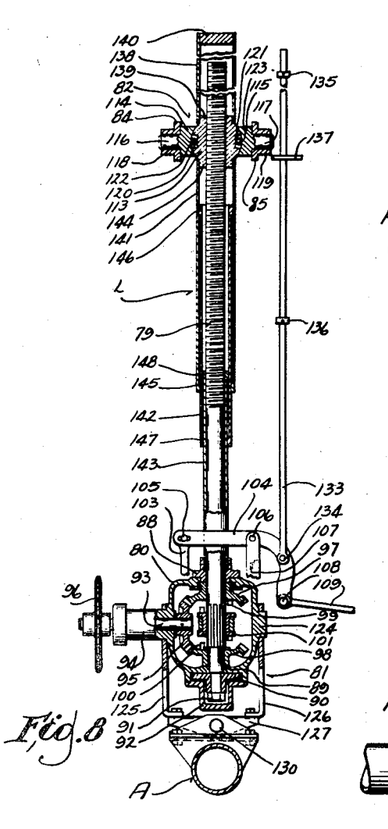
Fig. 8 is an axial sectional view, taken from the right side, of certain mechanism indicated in Figs. 1 to 3 inclusive.

Returning to a more detailed description of the preferred embodiment, screw 79 as seen in Fig. 8 is threaded only part of its length and extends into gear box 80, being journaled in bearing portions 88 and 89. At its lower end it has a thrust plate 90 fixed thereon as by a nut 91 and engaged between bearing portion 89 and a cap or closure 92. Screw 79 is thus prevented from moving axially in gear box 80. A shaft 93 is journaled in a bearing portion 94 of gear box 80 and carries a bevel gear 95. Shaft 93 also carries a sprocket or the like 96 which is driven from above mentioned engine E as will appear. Bevel gear 95 drives bevel gears 97 and 98 journaled in gear box 80 concentrically with screw 79, gears 97 and 98 rotating in opposite directions as is common in gears of this type. Gear 97 is provided with clutch teeth 99 while gear 98 is provided with clutch teeth 100 for alternative engagement with similar teeth on clutch element 101, slidably keyed to screw member 79. Engagement of clutch member 101 with gear 97 will result in rotation of screw 79 in one direction and engagement of clutch 101 with gear 98 will result in rotation of the screw in the opposite direction. Clutch 101 also has a neutral position in which gears 97 and 98 rotate idly without affecting screw 79.

Figures 9, 17:
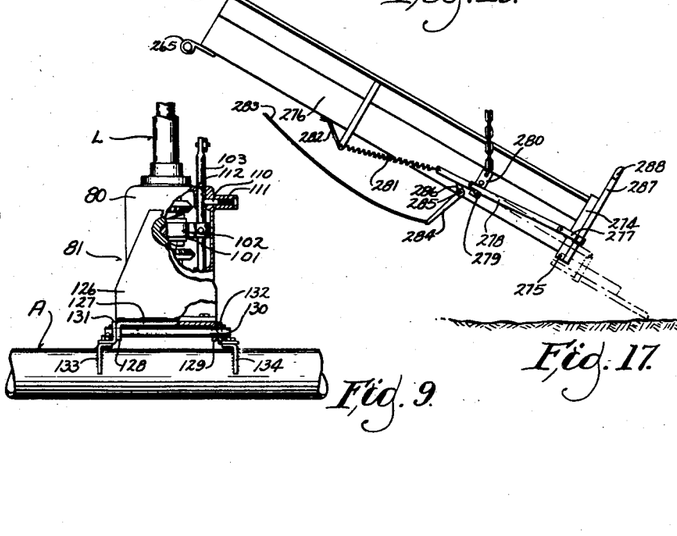
Fig. 9 is a rear elevation of a portion of the same with parts broken away.
Fig. 17 is a left side elevation of certain mechanism indicated in Fig. 3.

Clutch member 101 as more particularly seen in Fig. 9, has a shipper element 102 engaged therewith and fixed with a shifter rod 103 guided for sliding movement up and down in gear box 80. Rod 103 is controlled in position by means of a lever 104 having a pin and slot connection at 105 with rod 103. Lever 104 is fulcrumed at 106 on a bracket 107 fixed with gear box 80 and bends downwardly to a pivotal connection 108 with an actuating rod 109 by which clutch 101 may be shifted. A detent 110 pressed by a spring 111 engages notches as 112 in shipper rod 103 to yieldingly maintain clutch member 101 in shifted position.

Nut member 82 may be constructed in several ways within the contemplation of the invention, in the present instance a generally spherical nut 113, Fig. 8, being threaded on screw 79 and pivotally held between portions 114 and 115 of a ring-like member having trunnions 116 and 117. Portions 114 and 115 preferably provide a part spherical inner surface, and are united about nut portion 113 in any suitable or well-known manner providing a ball and socket joint between the nut and ring. Trunnions 116 and 117 are journaled in bearing portions 118 and 119 respectively, on bracket portions 84 and 85. Ring portions 114 and 115 may accordingly rock appreciably relatively to portions 84 and 85 in the swinging motion of leveling mechanism L as it follows the tilting of axle A.

Structures of this character are inherently flexible in all directions and for this reason a certain amount of swinging motion of leveling mechanism L may be experienced in the plane of trunnions 116 and 117. This is readily accommodated by shifting of nut portion 113 in ring portions 114 and 115. To prevent turning of nut portion 113 with screw 79, ball portion 113 has recesses 120 and 121, spuds 122 and 123, respectively on ring portions 114 and 115 fitting loosely into recesses 120 and 121. Thus rotation of nut or ball portion 113 is positively prevented while rocking of the same is possible in any direction.

Gear box 80, as will be apparent, shares any rocking movement of screw 79, and for this purpose is provided with a trunnion 124 which together with bearing portion 94, forms a pivotal mounting for gear box 80 in above mentioned yoke element 81. Thus gear box 80 may rock toward and away from thresher body T. Yoke portion 81 comprises side brackets 125 and 126 bolted or otherwise fixed to a base portion 127, Base portion 127 has downwardly extending ears 128 and 129, Fig. 9, through which extends a pivot shaft 130. Pivot shaft 130 also traverses upstanding ears 131 and 132 bolted or otherwise fixed with brackets 133 and 134 respectively fixed, for example by welding, with axle A. Yoke portion 81 may therefore rock in a plane transverse to the plane in which gear box 80 rocks about bearing 94 and trunnion 124. This accommodates slight misalignment of the parts caused by weaving or springing of the structure as above suggested in connection with nut 82. Thus with sprocket 96 continuously rotating, it is possible at any time to correct the position or attitude of thresher T, by shifting rod 109 in one or the other direction.

To guard against inadvertent over-travel of mechanism L, a limit control rod 133 is pivoted at 134 to above mentioned lever 104 and has collars 135 and 136 in position to be contacted by a plate or trip 137 fixed in the present instance with bracket member 85, and slidable on rod 133. The pitch of screw 79 and the direction of rotation of sprocket 96 are such that downward movement of rod 133 will result when clutch 101 is shifted to produce upward movement of nut portion 82. Thus if the parts are so shifted, and not returned to neutral, trip 137 will ultimately contact collar 135 raising rod 133 and returning clutch 101 to neutral position. As will be apparent, an analogous action will take place if the parts are shifted to produce downward movement of nut portion 82, trip member 137 contacting collar 136. Under these conditions, collar 136 will have been raised and downward movement thereof will also shift clutch 101 to neutral position. In normal operation trip 137 will not ordinarily travel far enough to contact either of collars 135 or 136 but in the event of an emergency the leveling or trimming action will be automatically stopped before damage can be caused to the mechanism.

In the present instance screw 79 is protected against dirt and the like by a housing 138 threaded for example on a boss 139 on nut portion 133, housing 138 extending upwardly to or beyond the extreme upward travel of screw 79 and being closed by a plug or the like 140. Screw 79 is also housed between nut portion 113 and gear box 80 by a series of telescopic housing sections 141, 142 and 143. Section 141 is threaded on a boss 144 on nut portion 113 and has an inwardly extending collar or flange portion 145 engageable with an upwardly extending flange portion 146 on above mentioned section 142. In similar manner, section 142 has an upwardly extending flange portion 147 engageable with an outwardly extending flange portion 148 on above mentioned section 143. It is thus impossible for sections 141, 142 and 143 to become separated and their combined length is greater than the extreme spacing between nut portion 82 and gear box 80. Section 143 is threaded or otherwise suitably fixed with bearing portion 88 of gear box 80.

Figures 6, 7, 16:
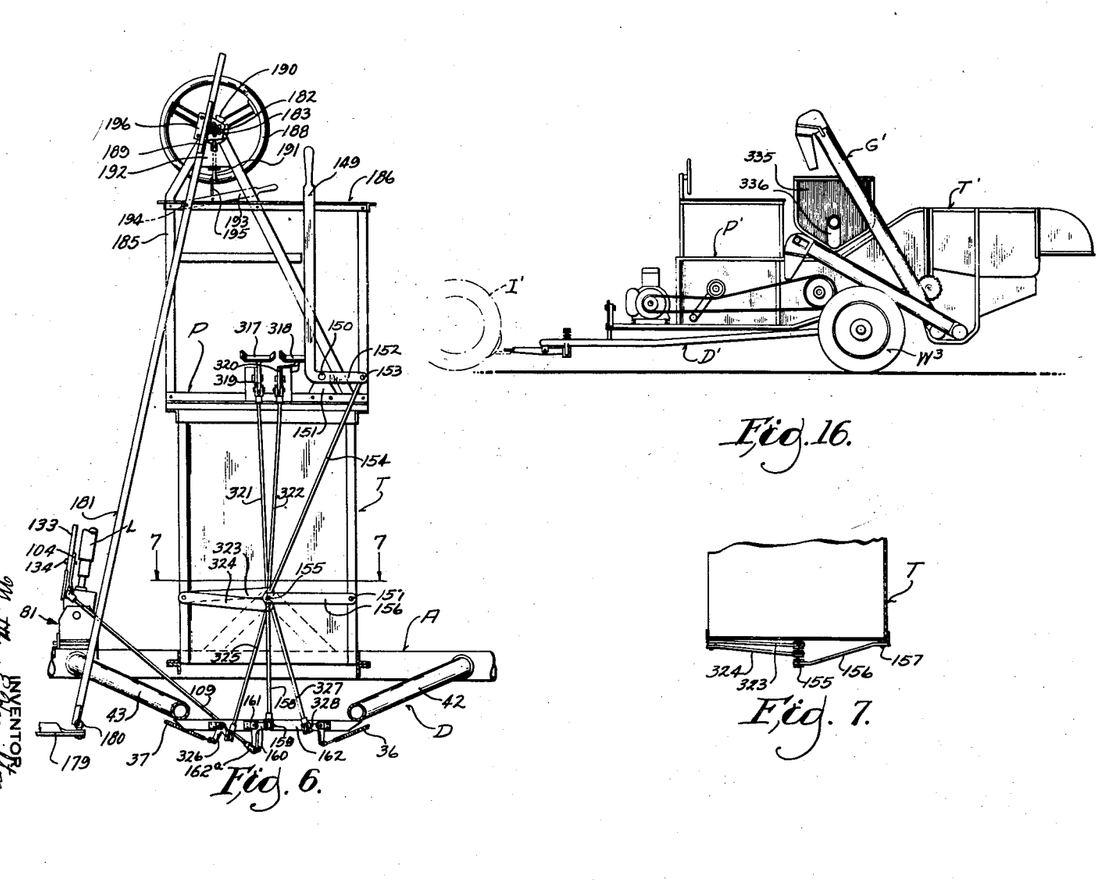
Fig. 6 is a vertical sectional view taken substantially on the line 6—6 of Fig. 2.
Fig. 7 is a sectional view taken on the line 7—7 of Fig. 6.

Clutch 101 is controlled from above mentioned platform P, a lever 149, Fig. 6, being fulcrumed at 150 on a bracket 151 carried by platform P. An arm 152 of lever 149 has pivoted thereto at 153 a link 154 extending to a pivotal connection 155 with a guide lever 156 (see also Fig. 7). Guide lever 156 is pivoted at 157 to thresher body T and serves to maintain pivotal connection 155 in the immediate region of the common center line of pivots 61 and 67. Pivotal connection 155 also carries a link 158 pivoted at 159 to a bell crank 160 fulcrumed at 161 on a cross member 162 suitably fixed with above mentioned tubes 42 and 43. Bell crank 160 is pivoted at 162ᵃ to above mentioned rod 109. Movement of lever 149 from side to side will accordingly push or pull on rod 109 and shift clutch 101 so as to engage the leveling mechanism for correcting the attitude of thresher body T as above described.

By virtue of the connection of link 154 to guide lever 156, substantially on the center line of pivots 61 and 67, the shifting of axle A and accordingly of cross member 162 will not affect the relation of lever 149 to clutch 101 in gear box 80 to any appreciable extent. It will now be apparent that thresher body T can be maintained approximately level while axle A tilts to follow the contour of the ground. Header H on the contrary is required to follow the ground contour and accordingly may be supported directly from axle A.

As seen in Fig. 1, axle A is provided with brackets 163 and 164 to which are pivotally connected arms 165 and 166. Arms 165 and 166 are united by a tubular brace 167 and a diagonal brace 168 extends from arm 166 outwardly and forwardly into supporting relation with header or platform H. Arm 165 extends directly into supporting relation with header H. Tubular brace 167 also engages diagonal arm 168 and unites the whole into a substantially rigid system pivoted to brackets 163 and 164. Header H accordingly may be raised or lowered by swinging of arms 165 and 166 on brackets 163 and 164, but in any of its adjusted positions header H will remain approximately parallel to axle A. Header H represents an appreciable amount of over-hanging weight and for substantially counterbalancing this, a weight 168 is carried on a lever 169 having arms 170 and 171 fixed with a fulcrum member 172 journaled in brackets 173 and 174 extending forwardly and upwardly from axle A and rigidly fixed therewith. Arms 170 and 171 are connected by links 175 and 176 with above mentioned tubular brace 167. The bifurcation of lever 169 provides for distributing the considerable upward pull more or less uniformly over the structure represented by braces 165, 166 and 167 and 168.

To provide for reducing the size of the machine for transport conditions, braces 165 and 168 are provided with flange joints or the like 177 and 178 respectively, so that header H may be readily removed and carried in some other manner to narrow the machine.

For controlling the height of header H, an arm 179 extends inwardly and forwardly from header H and is pivotally connected at 180 with a rack element 181 extending upwardly to a point above platform P where it engages a toothed wheel or pinion 182, Fig. 6, mounted on a shaft 183 and journaled in a bearing 184, Fig. 2. Bearing 184 in the present instance is carried on an upright 185 constituting part of a railing generally designated as 186 about platform P. A brace 187 also extends up from platform P and serves to brace railing 186 and to assist in the support of bearing 184. Shaft 183 carries a tiller wheel 188 by which pinion 182 may be rotated to move rake element 181 up or down as necessaary, the latter having a series of holes 189 for engaging the teeth of pinion 182. Shaft 183 also carries a notched plate 190 engaged by a spring pressed detent 191 slidable in a fitting 192 carried by members 185 and 187. Tiller wheel 188 and pinion 182 are thereby prevented from being inadvertently rotated by reason of the action of header H. Detent 191 may be removed from the notches in plate 190 by means of a lever 193 fulcrumed at 194 to a portion of railing 186 and connected by a link 195 with detent 191. Tiller wheel 188 is thereby released for operation when desired. Rack bar 181 is maintained in operative engagement with pinion 182 by means of a guide member 196 disposed about the rack bar and journaled on shaft 183. In this manner a limited amount of misalignment is possible between pinion 182 and rack bar 181 without impairing the operation of the parts.

Header H includes the usual cutter bar generally designated as 197 having a plurality of guards 198 and a sickle 199 actuated by a pitman 200 from a crank 201. It also includes an apron or draper 202 having a plurality of slats 203 and guide buttons 204. Apron 202 travels over a roller 205 journaled at the grain end of header H, then inwardly toward thresher body T in a plane substantially parallel to the ground. It then passes beneath guide members 206 and 207 and upwardly through feeder spout F and over a roller 208, Fig. 10. Roller 208 is driven from the combine mechanism as will appear and thereby pulls apron 202 in the direction indicated, the slack side of apron 202 returning to the under side of roller 205. In this manner, a continuous surface for conducting the grain into thresher body T is provided. The weight of grain on the upper run of apron 202 assists in easing the upward pressure against guides 206 and 207. Feeder spout F is hinged at 209, Fig. 3, to header H so that the spout may change its angle relatively to the header and remain in feeding relation to a feeder house portion 210 of thresher body T.

Figure 10:
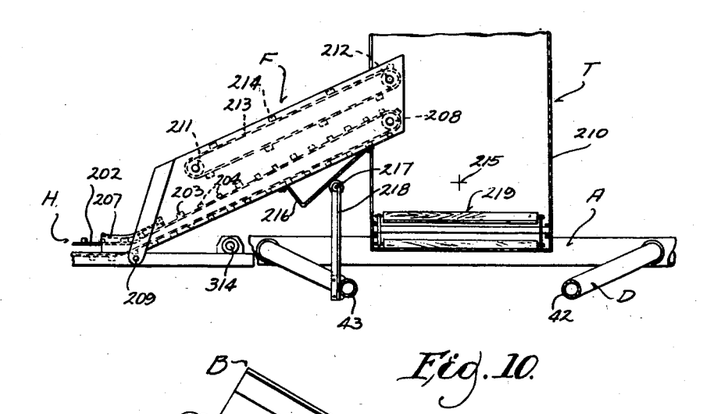
Fig. 10 is an enlarged sectional view taken on the line 10—10 of Fig. 2.

Feeder spout F also carries rollers 211 and 212 about which is directed an apron 213 having slats 214. In the present instance roller 211 is driven in the direction indicated from the combine mechanism and propels the underside of apron 213 in contact with the grain being elevated on above mentioned apron 202. As seen in Fig. 10, it will be apparent that the tilting of axle A and header H in effect will be about the common center-line of the pivots 61 and 67 indicated as 215 in Fig. 10. This results in a relatively small amount of movement between feeder spout F and feeder housing 210. It will be obvious from Fig. 10 that a lower position of the pivot or center-line 215 would cause a much larger movement of feeder spout F in feeder housing 210 with a given angular movement of axle A.

Feeder spout F is also affected by raising and lowering of header H through tiller wheel 188. In the present instance, feeder spout F rests, through a cam element 216, on a roller 217 carried in the present instance by an upright 218 fixed with tubular draw bar element 43. In this way the weight of feeder spout F is removed from any part of thresher housing T and with it any tendency to rack the latter. In the event of downward adjustment of header H, an increase in angle between the latter and feeder spout F would occur. However, owing to the angle of cam portion 216, and the outward shifting of header spout F resulting from such movement, cam portion 216 will move to a position on roller 217 which will tend to reduce the angle of header spout F. The aggregate result will be that feeder spout F will increase its angle somewhat but not to the extent that it would if cam portion 216 were omitted.

Passing now to the threshing mechanism, the severed grain flows into feeder house portion 210 as seen in Fig. 2 between roller 208 and 212 and is carried rearwardly by a raddle of well-known construction generally designated as 219. A rotary beater 220 of well-known construction urges the material from raddle 219 against a threshing cylinder 221 of suitable form in the present instance of the well-known spike tooth type. Cylinder 221 is provided with a concave 222, grain falling through concave 222 being carried by a rake or raddle 223 rearwardly and upwardly. Raddle 223 also receives straw discharged from cylinder 221 and which is intercepted by a down beater 224. The material carried rearwardly by raddle 223 is also agitated by a beater 225 and is then passed by raddle 223 over a relatively slowly rotating rod drum comprising a head 226 carrying a series of rods 227 forming a cage-like structure rotatable with a shaft 228. In this manner the straw is loosely supported and grain is given a chance to separate and fall through between the rods 227. From rod drum 227 the remaining material is deposited on a raddle 229 and transported to a second raddle 230 from which is is discharged at the rear of the machine. Straw on raddle 229 is agitated further by beaters 231 and 232. Grain transported by raddle 223 and also grain falling through rod drum 227 and raddle 229 is received on an upper sieve 233 of above mentioned cleaning shoe C, the grain falling through in well-known manner and also through lower sieves 234. Said grain is intercepted by a pan 235 and conducted to a clean grain auger 236 from which it is elevated by clean grain elevator G to a bagging spout of well-known form 237. Unthreshed heads or tailings pass to the rear of sieves 233 and 234 and are directed by the outer casing 238 of shoe C into tailings auger 239 from which they are transported by a tailings elevator 240 to be returned to cylinder 221 in well-known manner.

As is well-known, the sieves in the cleaning shoe must be maintained substantially level at all times and, insofar as lateral slope is concerned, this is cared for by the leveling of the threshing mechanism as a whole through above mentioned lever 149. However, it is often impossible to avoid heading the machine up or down hill to some extent, and to compensate for this, cleaning shoe C is automatically adjusted. Thus, the shoe is built on a frame generally designated as 241 (see also Fig. 15) which in the present instance is pivotally supported on the axis of a shaft 242 constituting the power input shaft for shoe C. A pendulum 243 having a weight 244 is pivoted at 245 to thresher body T and has an arm 246 pivotally connected by a link 247 to a point 248 displaced from shaft 242. Downward tilting of thresher body T will therefore be corrected by relative forward swinging of pendulum 243 and downward movement of link 247. This will cause counterclockwise rotation of shoe C about shaft 242, which will compensate for the downward tilting of the remainder of the combine. Grain auger 236 and tailings auger 239 are carried in a framework generally designated as 249 depending from thresher body T and entirely independent of shoe C. Therefore, they do not interfere with the swinging of the shoe under the influence of pendulum 243.

Variations in the details of construction of shoe C, are contemplated, but in the present instance frame portion 241 is fixed in any suitable manner as by a flange 250 with a tubular brace 251 which will be understood as extending across the shoe and uniting the two sides of frame 241. Brace 251 is journaled in bearings as 252 carried on sills 73 and 74. The remaining parts of shoe C including fan housing 253 are all supported from frame 241 and accordingly swing about tubular brace 251 in bearings 252. Brace 251 has bushings 253 in which is journaled above mentioned shaft 242. Brace 251 and shaft 242 accordingly are concentric and whereby shoe C may swing about the center of power input shaft 242.

The several mechanisms of shoe C are reciprocated from shaft 242, the latter having in the present instance a sprocket or the like 254 having a crank pin 255 actuating through a pitman 256 a rocker arm 257. Rocker arm 257 in the present instance is fixed with a shaft 258 journaled in suitable bearings 259 on a portion of frame 241. Shaft 258 has a plurality of arms 260 connected by a shaft 261 on which is supported above mentioned sieve 233. A second pitman 262 connects to a lever 263 fulcrumed on frame 241 and connected by a pivot 264 with a portion of housing 238. In this manner, housing 238 is reciprocated in one direction while upper sieve 233 moves in the opposite direction, it being understood that the pitman and other parts are duplicated on the opposite side of shoe C. Thus the inertia forces developed by the reciprocation of these parts approximately cancel each other and the reciprocating movements can take place without undue vibration. Furthermore, the power input to sprocket 254 can be accomplished without interference from relative tilting movement of shoe C. Also the relation of the blast from fan 253 to sieves 233 and 234 is not disturbed by such relative tilting movement.

Bag chute B is pivoted at 265 on an outrigger 266 extending from platform P and in the present instance is suspended at its lower end on chains 267 and 268 spaced apart by a spreader 269. Chains 267 and 268 in the present instance are connected to a cable 270 passing over a sheave 271 suitably supported above spreader 269, and across thresher body T and a sheave 272 to an anchorage 273 on axle A. When anchorage 273 on axle A rises due to the tilting of the axle, the lower end of bag chute B is lowered to avoid an excessive drop between the end thereof and the ground. On the other hand, when axle A is tilted in the opposite direction, the end of bag chute B is raised so as to avoid striking the ground.

Bag chute B has an end gate 274 partly automatic in character and which operates as follows. End gate 274 is pivoted at 275 to a body portion 276 of bag chute B and has arms 277 rigidly fixed therewith, the two being identical only one of which is shown. Pivoted to arms 277 are links 278 extending rearwardly of the bag chute and having notches engaging pins or the like 279. Pins 279 are fixed with body portion 276 as by means of fittings 280. Springs 281 pull on links 278 in a direction to maintain end gate 274 in closed position and also to tend to swing the links downwardly into engagement with pins 279. Springs 281 are anchored on a frame-work generally designated as 282 and are so proportioned as to be powerful enough to sustain end gate 274 when there is no load in body portion 276. When a plurality of bags is in body portion 276, however, end gate 274 is sustained by links 278 engaged with pins 279. When it is desired to release the load, a pull on a rope 283 causes a swinging movement of a lever 284 pivoted at 285 to a portion of body 276, raising arms 286 which contact and raise links 278 and release them from pins 279. The weight of the bags in chute 276 then overcomes springs 281 and forces end gate 274 to open position. A plurality of runners 287 and 288 form a part of end gate 274, swinging down and providing a path for the grain bags substantially all the way to the ground. As soon as the last bag is clear of runners 287 and 288, springs 281 overcome the weight of end gate 274 and swing it into closed position whereupon links 278 return into engagement with pins 279 thus locking the end gate in position to receive another load.

The various drives to the several operative parts may be of any suitable type within the contemplation of the invention, drives on combines being largely conventional and well known. However, certain features apparently novel will be illustrated and described. In the present instance, engine E has a pulley 289, Fig. 1, driving through a belt 290, a pulley 291 on a shaft 292, constituting the axis of cylinder 221. Shaft 292 on the right side of the machine drives, through a chain 293 and appropriate sprockets, above mentioned beater 224. Beater 224 has a shaft 294 passing through to the left side of the machine and driving, through a chain or the like 295, above mentioned beater 220 and a shaft 296 actuating above mentioned raddle 219. Chain 295 also drives a shaft 297 passing through to the right side of the machine. Shaft 296 drives, through a chain or the like 298, above mentioned tailings elevator 240. Tailings elevator 240 drives in well-known manner tailings auger 239. Tailings auger 239 has a shaft 299 which drives, through a chain 300, Fig. 1, a shaft 301 constituting the axis of above mentioned clean grain auger 236. Auger 236 drives clean grain auger G in well-known manner. Shaft 294 also drives, through a chain or the like 302, above mentioned sprocket 254, beater 225 and rod drum 227.

Shaft 242 passes entirely through tubular brace 251 and drives on the left side of the machine, through a chain 303, a shaft 304 constituting the axis of fan 253. The drives to raddles 223, 229 and beaters 231 and 232 being conventional in character and forming no part of the invention, are not shown in the interests of avoiding complication.

Above mentioned shaft 297, Fig. 1, extends into a gear box 305 and drives, through bevel gears and a tumbler shaft generally designated as 306 of well-known form, a shaft 307. Shaft 307, Fig. 3, drives, through a sprocket 308 and chain 309 or the like, above mentioned sprocket 96 and a sprocket 310 on a shaft 311, an idler 312 being interposed for adjusting and other purposes. Shaft 311, as seen in Fig. 1, drives, through a tumbler shaft 313, a shaft 314 constituting the axis of above mentioned crank 201 on header H. Shaft 201 also drives, through a chain or the like 315, above mentioned roller 208. Chain 315 also drives above mentioned roller 211, Fig. 10, and a sprocket 316 constituting a drive to above mentioned reel R which, being of well-known form need not be further described.

Platform P is equipped with brake pedals 317 and 318 having outwardly projecting arms 319 and 320 connected by links 321 and 322 with guide levers 323 and 324 respectively. After the manner of above described guide lever 156, guide lever 324 connects link 321 with a link 325 leading to a bell crank 326 pivoted on above mentioned cross member 162 and connecting with above mentioned brake actuating cable 37. In similar manner link 322 is connected by guide lever 323 with a link 327 leading to a bell crank 328, also pivoted on cross member 162 and connecting with above mentioned brake actuating cable 36. It will now be apparent that an operator on seat 329 can operate either or both brakes 35 and 36 as necessary for complete control of the combine. Tilting of axle A relatively to thresher body T will have no appreciable effect on this control because of the relation of guide levers 323 and 324 to the center-line of pivots 61 and 67, as explained in connection with the operation of leveling control 149.

In extremely hilly country the tractor will sometimes tilt sharply before wheels W¹ and W² reach the sloping portion of the ground. For this situation, a modified draw bar construction as seen in Figs. 13 and 14 is used. In above mentioned reinforcing tube 46 is journaled a shank portion 330 having a head 331 to which is pivotally attached a loop 332 as by a pin 333. Shank 330 is prevented from being pulled out of tube 46 by means of a nut 334. A strong connection is thereby supplied and which allows unlimited tilting between draw bar portion D and tractor I.

Under some conditions, it is preferred to store the harvested grain in bulk rather than in bags. For this purpose, a modified arrangement as seen in Fig. 16 is provided. The parts of this machine correspond substantially with those of Figs. 1 and 2 but clean grain elevator G' discharges into a bin 335, carried above thresher body T' and in the present instance located somewhat ahead of the center of wheel W³. Bin 335 is located centrally over thresher body T' or in the longitudinal plane thereof so that the load in bin 335 will not tend to unbalance thresher body T', but will merely impose a slight additional load on tractor I'. Bin 335 may be unloaded in any suitable or well-known manner, in the present instance being provided with a spout 336 through which the grain is discharged mechanically or otherwise in well-known manner.

The operation of the machine is thought to be clear from the above description but it is pointed out that the extreme stress developed by the pull of the tractor and the reaction against cutter bar 197 are never imposed on the thresher body but are carried entirely in draw bar portion D and axle A to which header H is connected as described. Thresher body T rides freely pivoted on axle A and draw bar D at two points, and accordingly is relieved of all distortion and strain which might be caused by the pull of the tractor. A superior construction of less cost is accordingly provided than that of hillside combines as heretofore constructed.

The above being a complete description of an illustrative embodiment of the invention, what is claimed as new and desired to be secured by Letters Patent of the United States is:

1. In a hillside combine the combination of an axle transverse to the direction of travel of said combine having a header and conveyor rake mounted thereon, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, and means connected to the axle and to the thresher body at a point spaced vertically from the pivots for rocking the thresher body and adjusting its angle relatively to the axle.

2. In a hillside combine the combination of an axle transverse to the direction of travel of said combine having a header and conveyor rake mounted thereon, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, means connected to the axle and to the thresher body at a point spaced vertically from the pivots for rocking the thresher body and adjusting its angle relatively to the axle, a spout support on said draw bar, and a feeder spout carried partly on said header and partly on said spout support, independently of any contact with said thresher body and extending from said header into said thresher body.

3. In a hillside combine the combination of an axle transverse to the direction of travel of said combine having a header and conveyor rake mounted thereon and maintained thereby substantially in parallel relation to the ground traversed by said axle, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, and means connected to the axle and to the thresher body at a point spaced vertically from the pivots for rocking the thresher body and adjusting its angle relatively to the axle, said header having a feeder spout supported thereon independently of any contact with said thresher body, and projecting within the confines of said thresher body to a point from which the distance to said common center line is less than half the width of said thresher body at said point.

4. In a hillside combine the combination of an axle transverse to the direction of travel of said combine having a header and conveyor rake mounted thereon, wheels supporting the axle, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, means connected to the axle and to the thresher body at a point spaced vertically from the pivots for rocking the thresher body and adjusting its angle relatively to the axle, hinge connections between the wheels and axle and including pivots which extend substantially in the direction of travel of the combine, said hinge connections disposed substantially within the confines of their respective wheels, spindles for said wheels carried by said pivots, and arms extending substantially vertically from said spindles, an arm extending substantially vertically from said thresher body, links connecting the arm on the thresher body with the arms on said spindles, said arms being disposed parallel to each other and of a common length, whereby said wheels will be adjusted to angles relative to said axle corresponding with the angle to which said thresher body is adjusted.

5. In a hillside combine the combination of an axle transverse to the direction of travel of said combine having a header and conveyor rake mounted thereon, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, and means connected to the axle and to the thresher body at a point spaced vertically from the pivots comprising a screw mechanism and a reverse gear for rocking the thresher body and adjusting its angle relatively to the axle.

6. In a hillside combine the combination of an axle transverse to the direction of travel of said combine having a header and conveyor rake mounted thereon, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, and means connected to the axle and to the thresher body at a point spaced vertically from the pivots and substantially in a plane normal to the direction of travel of the combine and passing through one of the pivot members for rocking the thresher body and adjusting its angle relatively to the axle.

7. In a hillside combine the combination of an axle transverse to the direction of travel of said combine having a header and conveyor rake mounted thereon, wheels supporting the axle, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, means connected to the axle and to the thresher body at a point spaced vertically from the pivots for rocking the thresher body and adjusting its angle relatively to the axle, an operator's platform on the combine, brakes individual to said wheels and controls individual to said brakes and extended to said platform for actuation by an operator stationed thereon.

8. In a hillside combine the combination of an axle transverse to the direction of travel of said combine having a header and conveyor rake mounted thereon, a draw bar attached to the axle and having connection to a tractor, said axle and draw bar having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, means connected to the axle and to the thresher body at a point spaced vertically from the pivots for rocking the thresher body and adjusting its angle relatively to the axle, an operator's platform on the combine, a control on the platform, mechanism on the axle responsive to said control, and connections extended between said mechanism and said platform including a plurality of links extending substantially through said longitudinal axis and having a pivotal connection substantially on said longitudinal axis, whereby relative rocking between said thresher body and said axle will cause pivotal movement between said links at said pivot connection, but will be without effect as to the relation between said control and said mechanism.

9. In a hillside combine the combination of an axle transverse to the direction of travel of said combine having a header and conveyor rake mounted thereon, a draw bar attached to the axle and having connection to a tractor, said axle and draw bar consituting a unit having pivot members thereon with pivots spaced thereabove, a thresher body mounted on said pivots and rockable thereabout, said pivots being disposed on a common center line passing through a portion of the thresher body intermediate the vertical limits thereof and extending in the direction of travel of the combine, means connected to the axle and to the thresher body at a point spaced vertically from the pivots for rocking the thresher body and adjusting its angle relatively to the axle, a bag chute pivoted at one end to one side of the thresher body and having the other end free, and a connection from said bag chute leading across said thresher body and connected to said axle unit on the opposite side of said thresher body from said bag chute, whereby said bag chute will be lowered when the point of attachment of said connection with said axle unit rises, and raised when said point of attachment lowers, to maintain said bag chute a predetermined distance above the ground in spite of changes in the slope thereof.

MATTHEW E. HAMILTON.
PATRICK W. MORRISSEY.

REFERENCES CITED

The following references are of record in the file of this patent:

UNITED STATES PATENTS

| Number | Name | Date |
|---|---|---|
| 457,185 | Davis | Aug. 4, 1891 |
| 764,205 | Reynolds | July 5, 1904 |
| 905,985 | Clove | Dec. 8, 1908 |
| 916,884 | Martyn | Mar. 30, 1909 |
| 1,323,502 | Thomas et al. | Dec. 2, 1919 |
| 1,469,157 | Kast | Sept. 25, 1923 |
| 1,542,126 | Harris | June 16, 1925 |
| 1,735,950 | Brasch | Nov. 19, 1929 |
| 1,847,530 | Heyden | Mar. 1, 1932 |
| 1,853,221 | Pierson | Apr. 12, 1932 |
| 1,959,689 | Ronning | May 22, 1934 |
| 2,040,699 | Lindgren | May 12, 1936 |
| 2,044,139 | Welty | June 16, 1936 |
| 2,273,666 | Smith | Feb. 17, 1942 |
| 2,293,328 | Coburn | Aug. 18, 1942 |